(No Model.)
P. M. MISHLER.
HEDGE.
No. 403,949. Patented May 28, 1889.
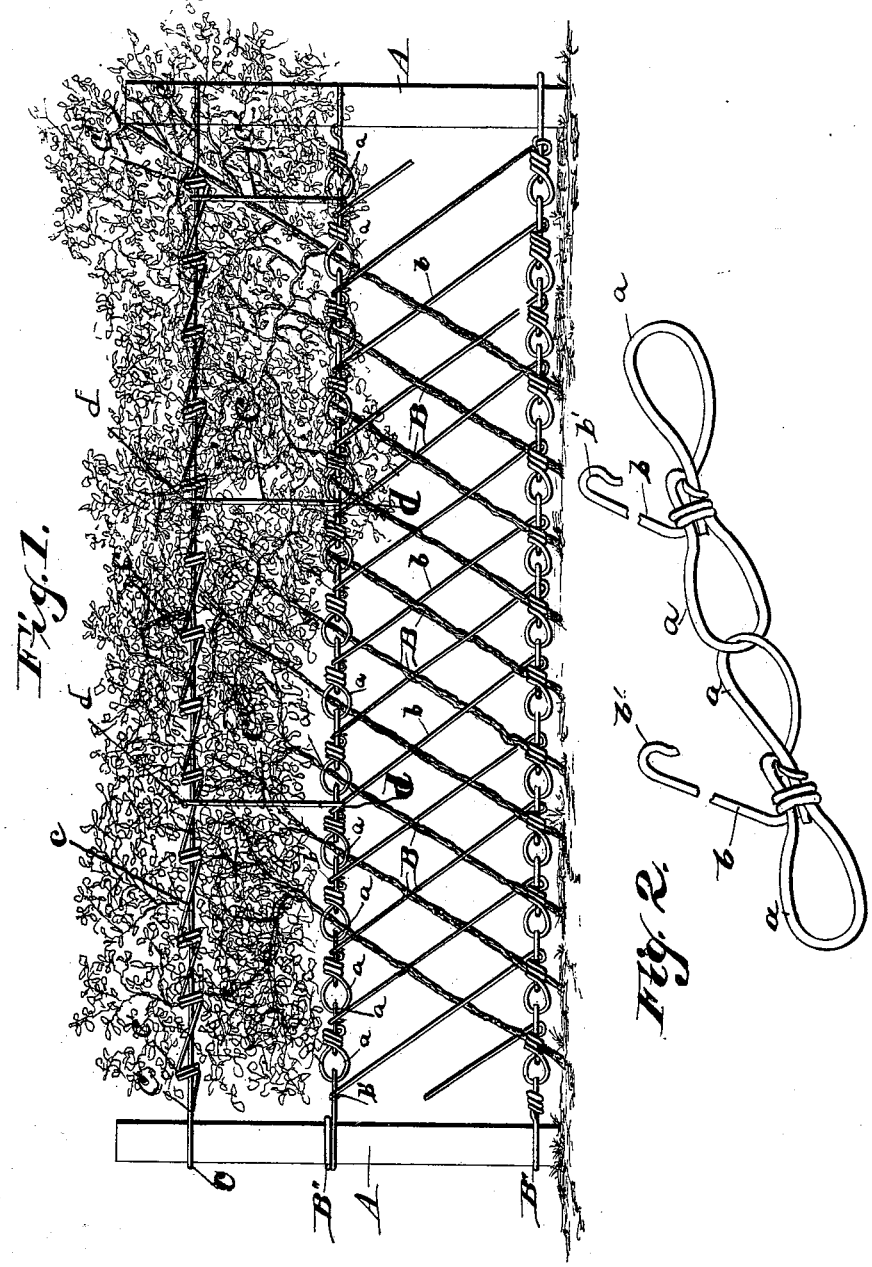
WITNESSES:
INVENTOR
P. M. Mishler
by E. H. Bates, Attorney

UNITED STATES PATENT OFFICE.

PHARES M. MISHLER, OF HAGERSTOWN, MARYLAND.

HEDGE.

SPECIFICATION forming part of Letters Patent No. 403,949, dated May 28, 1889.

Application filed November 12, 1888. Serial No. 290,591. (No model.)

*To all whom it may concern:*

Be it known that I, PHARES M. MISHLER, a citizen of the United States, residing at Hagerstown, in the county of Washington and State of Maryland, have invented certain new and useful Improvements in Hedges, (and is an improvement on Letters Patent granted to me on the 3d day of April, 1888, numbered 380,448;) and I do hereby declare the following to be a full, clear, and exact description of the invention, such as will enable others skilled in the art to which it appertains to make and use the same.

This invention relates to novel improvements in hedges; and it consists in the novel construction and arrangement of the plashing-wires in combination with the living plants of a hedge, all as will be hereinafter more fully explained, and particularly pointed out in the appended claim.

The annexed drawings, to which reference is made, fully illustrate my invention, in which—

Figure 1 represents a side view of my device, and Fig. 2 is a perspective view of the lower rail.

Referring by letter to the accompanying drawings, A A are two fence-posts, and B represents the hedge of living plants, which are inclined, as shown, and are held in this position by the devices hereinafter fully explained.

B' B'' represent an upper and lower horizontal link-rail, the latter of which is constructed in link form, the same consisting of two eyes or loops, $a\ a$, which connect with the adjacent link, as shown, providing a continuous chain or upper rail for the plants. These links are formed of a single piece of wire, bent upon itself and twisted around its center, as shown in the annexed drawings, and the two opposite ends of the chain-rail are connected to the posts A A.

The lower link-rail, B', is formed in a similar manner, except that an extended end, $b$, is provided, that is a part of each link, and the same is passed obliquely upwardly and in and out on either side of the plants to the upper rail, where it is connected by the hooked end $b'$ to one of the eyes or loops in said rail. In connection with these rails I provide a third line-wire or loop-rail, which is arranged above the rail B''. This wire is secured to the end posts above the link-rails, and at intervals are formed loops $c$ by making the twist $c'$ around the line-wire. These loops are designed for holding the plants in the desired inclined position, as shown, the plants passing through them, and a rod, $c^2$, having a hook, $d$, at each end, connects the line-wire to the top link-rail at intervals, thereby supporting this rail and preventing sagging of the same.

It will be seen that I construct the plashing-wires $b$ and the lower rail, or the separate links thereof, in one piece, and in combination with the upper rail and its supporting line looped wire a strong and impenetrable hedge is provided.

It will be observed that the loops $a\ a$ constitute a series of holders for the stems of the plants, while the upper rail-sections are especially adapted for facilitating the plashing of the branches and holding the same compactly. It will also be observed that the lower chain-rail, B', is constructed of loops or links having hooked brace-extensions adapted to engage with the links of the upper rail, B'', for tying the two rails together and affording support for the twisted stems of the plants between said rails.

What I claim, and desire to secure by Letters Patent, is—

The combination, in a hedge, of the upright posts A A, the chain-rails B' B'', formed of loops $a\ a$, the diagonal braces $b$, formed integral with the chain-sections of the lower rail and hooked to the upper rail between the loops thereof, a top loop-rail, $c$, and vertical tie-rods $c^2$, all constructed and adapted for joint operation, as specified.

In testimony whereof I affix my signature in presence of two witnesses.

PHARES M. MISHLER.

Witnesses:
   GEO. B. CEARFOSS,
   JOSIAH BAKER.